Aug. 18, 1931.  E. L. PETERSON  1,819,439
SPEED REGULATING SYSTEM
Filed Aug. 23, 1929  2 Sheets-Sheet 1
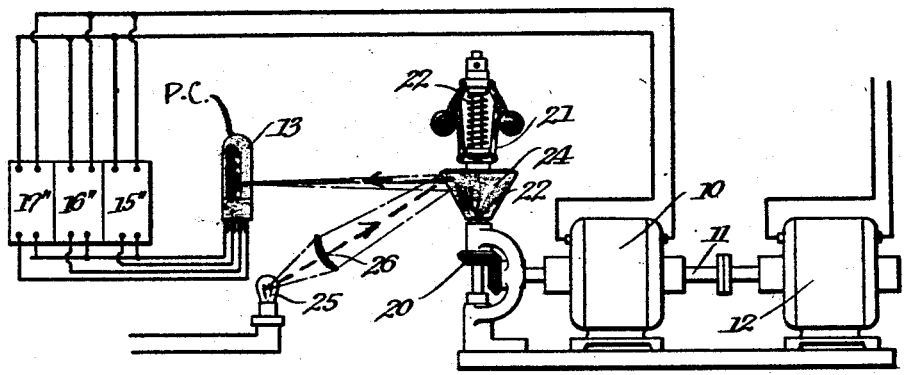
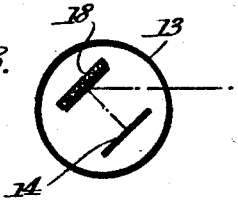
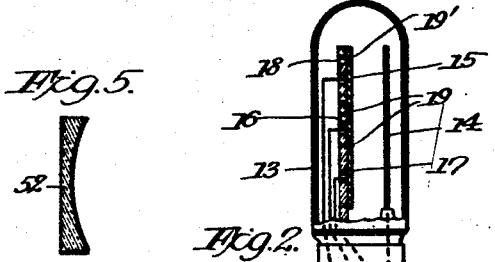
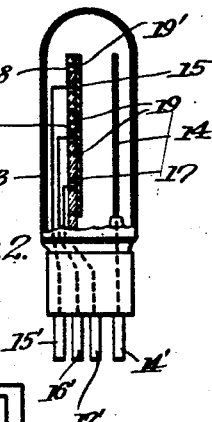
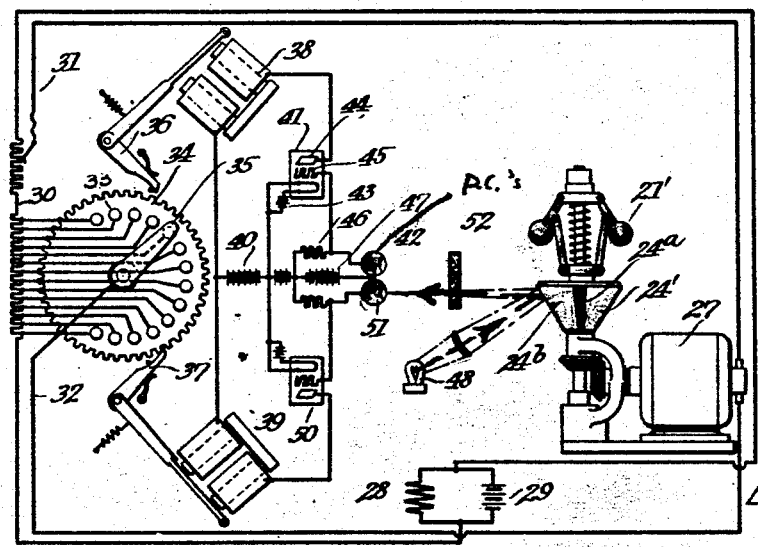
Inventor
Elwin L. Peterson.

Aug. 18, 1931.   E. L. PETERSON   1,819,439
SPEED REGULATING SYSTEM
Filed Aug. 23, 1929   2 Sheets—Sheet 2

Inventor
Elwin L. Peterson

Patented Aug. 18, 1931

1,819,439

UNITED STATES PATENT OFFICE

ELWIN L. PETERSON, OF RIVERSIDE, CALIFORNIA

SPEED REGULATING SYSTEM

Application filed August 23, 1929. Serial No. 388,024.

The present invention relates to control systems and to an apparatus for controlling the speed of a moving element.

More particularly, the invention has to do with that type of system which involves the use of light rays as an exciting medium for a light responsive device, such as a photo-electric cell, which is controllably associated with the element, the speed of which is to be regulated.

The invention also relates to the application of this system of speed control for the purpose of synchronization, and in this aspect, involves the utilization of one moving element to regulate the action of the light responsive medium in its control of either the same moving element or of a different element.

An object of the invention is to provide an apparatus which involves the use of comparatively few parts and which because of its simplicity is efficient and reliable in operation.

In its broader aspects, the invention involves the use of a light responsive means so constructed and related to the element to be controlled that as light is imposed upon different parts thereof, its controlling action is varied. As a means for imposing the light upon this cell in a variable manner, there may be used a constantly driven device adapted to direct rays of an exciting lamp upon the light responsive element or cell, this being accomplished, preferably, by reflection and in such a way as to supply a constant beam of light for the photo-electric cell which may be used to control the driving element for the reflector.

The light responsive medium may be a single cell or a plurality of cells suitably connected with amplifying media which are in circuit with the element, the speed of which is to be regulated.

The foregoing and other objec's and features of the invention will be clearer as the description proceeds in connection with certain preferred embodiments shown in the accompanying drawings, wherein:

Figure 1 is an elevational view of a system embodying my invention.

Figure 2 is an elevational view of a suitable photo-electric cell.

Figure 3 is a horizontal sectional view of the cell shown in Figure 2.

Figure 4 is a somewhat diagrammatic view of a modified form.

Figure 5 is a vertical sectional view taken through the beam focusing lense shown in Figure 4.

Figure 6:
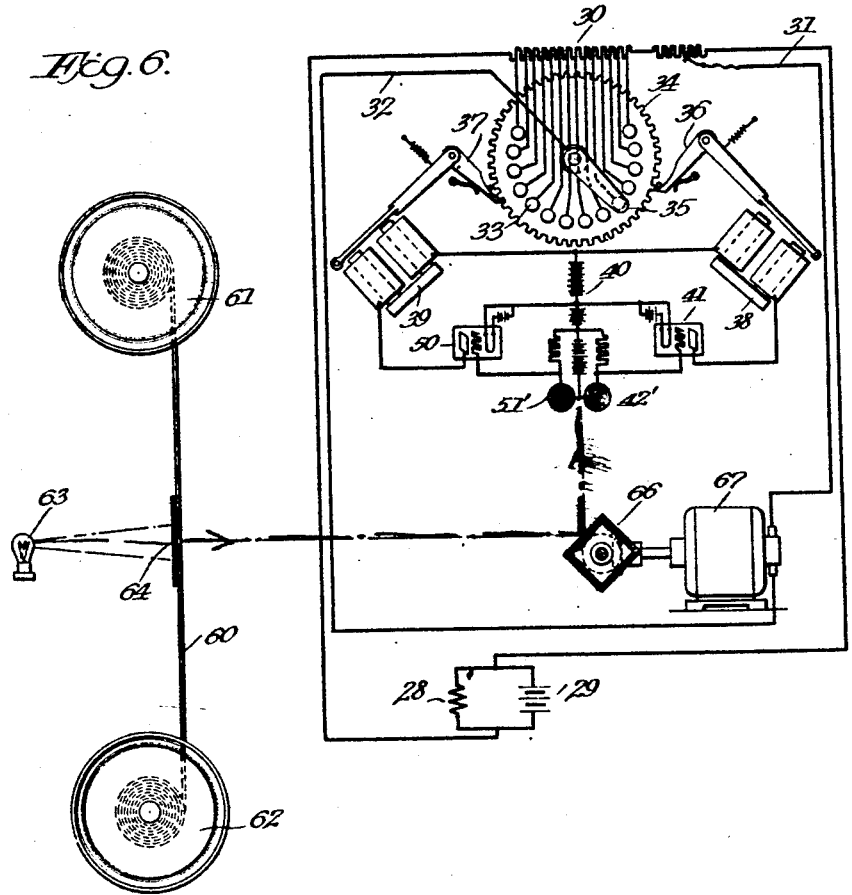
Figure 6 is a diagrammatic view of still another modification.

Referring to the drawings for a more detailed description, 10 indicates an element, the speed of which is to be regulated, the same in the present instance being a motor. The motor may be connected by a shaft 11 with a generator 12 adapted to supply current to any desired point.

The speed of the motor 10 may be regulated from a light responsive means or cell, such as a photo-electric cell 13, which should be of a character adapted to vary the speed of the motor as light is imposed upon different parts of the cell. For this purpose, the cell may have a plurality of cathodes 15, 16, 17, insulated from each other as at 19 and each having transparent glass backing 18, and a light exciting coating 19', such as potassium, which when exposed to light, produces a discharge of electrons. A common anode 14 may be provided with a terminal 14' and each of the cathodes is connected by terminals 15', 16', 17' to separate amplifying devices or units 15'', 16'', 17''.

The amplifying units are each connected in a suitable manner with the motor and regulate the supply of current for the motor which passes through these amplifying units; the current supply may be a battery or any other source. Since the precise character of the various amplifying units forms no part of the present invention, it is thought unnecessary to describe the same in detail, and for example, I refer to the patent to Potter, 1,692,904, November 27, 1928, as showing a suitable circuit for amplifying the response of the photo-electric cell 13. It will be understood, of course, that each of the different amplifying units 15'', 16'' and 17'' has associated therewith a motor current source and is adapted to produce a different speed in the motor 10. These units may be multiplied as desired.

For the purpose of imposing the light upon the desired cathode, the motor 10 may drive through gearing 20 a governor 21, which is adapted as its speed varies, to move along the vertical shaft 22 a substantially conically shaped reflector 24 adapted to reflect rays from an exciter lamp 25 toward the cell 13. Rays from the light 25 pass through a lens 26 so as to be reduced to a pencil-like beam, which may be moved back and forth between the cathodes of the photo-electric cell to regulate the speed of the motor 10.

It will be understood, of course, that the motor receives its power from any suitable supply which passes through the amplifying units, each of which may have separate source, such as batteries, as illustrated in the patent mentioned above, or a common source from any suitable supply line. Of course, each unit produces a different amplification of current, and, as will be observed, each has a cathode in cell 23 of different area so as to produce this result.

Referring to Figure 4, the reflector 24' movable longitudinally of the governor shaft is driven from a motor 27 of the direct current type having its field 28 connected across a direct current source represented as a battery 29. The armature circuit of the motor is connected across a variable portion of a resistance 30 connected across the battery 29. Armature lead 31 is manually adjustable along the upper portion of resistance 30, and armature lead 32 is adjustable along the lower portion of the resistance 30 by means of an automatic rheostat which is made responsive to very slight variations in the relative rates of rotation of the governor 21' and of the reflector 24', so as to maintain the motor at the desired speed. In this form, the cone-shaped reflector has dark or non-reflecting strips 24a formed as by printing thereon, alternating with reflecting strips 24b so as to make the light reflection intermittent and work the relay more than once, if necessary. The rheostat comprises stationary contacts 33 connected by taps to different points on the lower section of the resistance 30, a rotatable ratchet wheel 34 to which is secured the rheostat arm 35, ratchets 36 and 37 for rotating the wheel 34 in opposite directions of rotation, and relays 38 and 39 for respectively operating the ratchets 36 and 37.

Relay 38 is connected to a battery 40 through an amplifying tube 41, and the operation of the tube is controlled by a photo-electric cell 42 located so as to have light rays imposed thereon by the reflector 24' as the latter moves upwardly. The tube is of the vacuum type, preferably a pliotron tube, having a filament heated by a local battery 43, and connected to the proper point on the battery 40, a plate 44 connected to the relay 38, and a grid 45 connected through a resistance 46 to the source 40. The resistance 46 is also connected across a battery 47 in series with the photo-electric cell 42, as represented, so that when the cell becomes active, due to the entrance of light rays emanating from the exciter lamp 48 and reflected by the reflector 24', the potential of the grid 45 will be changed and allow current to flow through the plate circuit, including the relay 38 from the battery 40. Pliotron grids have a strong negative bias when no light enters the photo-electric cells so that no current flows in the plate circuit except when the rheostat is being operated.

Relay 39 is controlled in a similar manner by a tube 50 and a photo-electric cell 51 when light rays are imposed upon this cell by the reflector.

From the foregoing description, the manner in which the light rays from the source 48 are allowed to control the motor will be clear. Of course, the photo-electric cells 42, 51 are enclosed so that only light from the exciting source 48 can reach them, and the same must pass through the lens 52 so as to be focused properly. As the speed of the motor varies, it will move the beam reflected by the rotating reflector 24' back and forth between the photo-electric cell 42 and the cell 51, thereby regulating the rheostat and controlling the motor speed.

A further detailed description of this form is thought unnecessary, since the control mechanism is similar to that disclosed in the patent to Hoxie, 1,618,757, granted February 22, 1927. This form of device utilizes, as will be understood, my method of controlling or regulating speed by means of a constantly driven element adapted to reflect light, and as it moves bodily to change the path of reflection so that the light is imposed upon differently responsive photo-electric means adapted to change the speed of a moving element which in the form described, is the motor 27.

Figure 7:
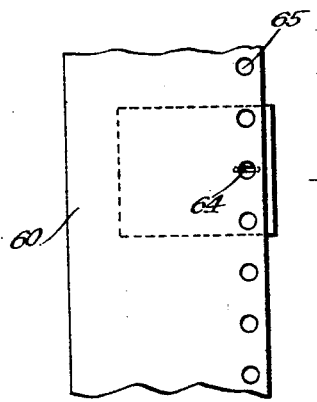
Figure 7 is a detail view.

Referring to Figures 6 and 7, the method is shown as used for the purpose of synchronizing the speed of a motor or other element with a separately driven moving element. In this form of the device, one element may be, for instance, a film strip 60 travelling from a supply reel 61 to a take-up reel 62, the latter being driven by any suitable means (not shown). Arranged adjacent the path of the film is an exciter lamp 63 adapted to project rays through an aperture 64 in a gate, the aperture being disposed so that it will coincide with openings 65 in the film strip as the latter pass the gate. Light rays passing through the film opening 65 are reflected by the faces of a mirror element 66 driven from a motor 67, the speed of which is to be controlled. The motor 67 is shown as connected in circuit with photo-electric cells 42', 51'; the remainder of the circuit corresponds with that shown in Figure 4, and in the patent to Hoxie mentioned above. The speed of the motor will ordinarily be such that as the film aperture 65 coincides with the gate aperture 64, the light will be reflected, for example, between the photo-electric cells 42', 51', thus maintaining the rheostat in set position. However, should there be any variation in the speed of the motor which may be employed to drive any device which is to be synchronized with the film 60, the light will be reflected at such an angle as to be imposed upon either the photo-electric cell 42' or the photo-electric cell 51', depending upon whether the speed of the motor is relatively slower or relatively faster than the speed of the film 60. It is thought unnecessary to describe in detail the operation of the mechanism illustrated in Figure 6, since this is set forth in detail in the patent above mentioned and in connection with the description of the construction shown in Figure 4, which is identical, the parts of the two mechanisms bearing corresponding numerals, except for the photo-electric cells.

Obviously, numerous modifications may be made in the structure and system illustrated and described without departing from the invention, the characteristic features of which are more definitely set forth in the following claims.

I claim:—

1. In a speed regulating system, a source of light, a driven element adapted to reflect the light and variable in position to change the path of travel of the reflected light as the speed of the element varies, a motor, means for varying the position of said driven element and light responsive means for controlling the speed of said motor in accordance with changes in the path of said reflected light.

2. In a speed regulating system, a source of light, a driven element adapted to reflect the light and variable in position to change the path of travel of the reflected light as the speed of the element varies, a motor for driving said element, means for varying the position of said driven element and light responsive means for controlling the speed of said motor in accordance with changes in the path of said reflected light.

3. In a speed regulating system, a source of light, a driven element adapted to reflect the light and bodily movable in accordance with speed variations thereof to change the path of travel of the reflected light as the speed of the element varies, a motor, means for bodily moving said element and light responsive means for controlling the speed of said motor in accordance with changes in the path of said reflected light.

4. In a speed regulating system, a source of light, a driven element adapted to reflect the light and bodily movable in accordance with speed variations thereof to change the path of travel of the reflected light as the speed of the element varies, a motor, means for bodily moving said element and light responsive means for controlling the speed of said motor in accordance with changes in the path of said reflected light.

5. In a speed regulating system, a source of light, a driven element adapted to direct the light selectively along a plurality of different paths and to transpose the light from one path to another as the speed of the element varies, a motor, means for variably controlling said element to change the path of the reflected light and light responsive means for controlling the speed of said motor in accordance with the transportation of the light from one path to another.

6. In a speed regulating system, a source of light, a driven element adapted to direct the light selectively along a plurality of different substantially parallel paths and bodily movable as it is driven to transpose the light from one path to another as its speed of movement varies, a motor, means for bodily moving said element and light responsive means for controlling the speed of said motor in accordance with the transposition of the light from one path to another.

7. In a speed regulating system, a source of light, a driven element adapted to direct the light selectively along a plurality of different paths and to transpose the light from one path to another as the speed of the element varies, a motor for driving said element, means for variably controlling said element to change the path of the reflected light and light responsive means for controlling the speed of said motor in accordance with the transposition of the light from one path to another.

8. In a speed regulating system, a source of light, a driven element adapted to direct the light selectively along a plurality of different substantially parallel paths and to transpose the light from one path to another as the speed of the element varies, a motor for driving said element, means for variably controlling said element to change the path of the reflected light and light responsive means for controlling the speed of said motor in accordance with the transposition of the light from one path to another.

9. In a speed regulating system, a source of light, a driven element adapted to direct the light selectively along a plurality of different paths and bodily movable as it is driven to transpose the light from one path to another as the speed of the element varies, a motor, means for bodily moving said element and light responsive means for controlling the speed of said motor in accordance with the transposition of the light from one path to another.

10. In a speed regulating system, a source of light, a driven element adapted to direct the light selectively along a plurality of different substantially parallel paths and bodily movable as it is driven to transpose the light from one path to another as the speed of the element varies, a motor, means for bodily moving said element and light responsive means for controlling the speed of said motor in accordance with the transposition of the light from one path to another.

11. In a speed regulating system, a source of light, a driven element adapted to direct the light selectively along a plurality of different substantially parallel paths and bodily movable as it is driven to transpose the light from one path to another as the speed of the element varies, a motor for driving said element, means for bodily moving said element and light responsive means for controlling the speed of said motor in accordance with the transposition of the light from one path to another.

12. In a system for regulating speed, a motor, a light responsive cell, means connecting said cell with said motor whereby to control its speed in accordance with the varying response of the cell to light imposed thereon, said light responsive cell being differently responsive at different parts thereof whereby to change speed, a source of light, a driven element, and means for imposing said source of light upon different parts of said light responsive cell in accordance with changes in the speed of the driven element.

13. In a system for regulating speed, a motor, a light responsive cell, means connecting said cell with said motor whereby to control its speed in accordance with the varying response of the cell to light imposed thereon, said light responsive cell being differently responsive at different parts thereof whereby to change speed, a source of light, a driven element, and means for imposing said source of light upon different parts of said light responsive cell in accordance with changes in the speed of the driven element, said element being driven from said motor.

14. A speed regulating system as defined in claim 12, said driven element having a reflecting capacity and serving to reflect the light along different paths to said light responsive cell as the speed of the driven element varies.

15. In a speed regulating system, a source of light, a rotating reflector adapted to reflect the light and movable from one position to another as its speed of rotation varies to change the path of travel of the reflected light, a motor, means for changing the position of said reflector and light responsive means for controlling the speed of said motor in accordance with changes in the path of said reflected light.

16. In a speed regulating system, a source of light, a rotating reflector adapted to reflect constantly the light and movable along its axis of rotation as the speed of rotation varies to change the path of travel of the reflected light, a motor, means for moving said reflector along its axis of rotation and light responsive means for controlling the speed of said motor in accordance with changes in the path of said reflected light.

17. In a speed regulating system, a source of light, a rotating reflector adapted to reflect the light and bodily movable as the speed of rotation varies to change the path of travel of the reflected light, a motor, means for bodily moving said reflector and light responsive means for controlling the speed of said motor in accordance with changes in the path of said reflected light.

18. In a speed regulating system, a source of light, a rotating reflector adapted to reflect constantly the light and bodily movable as the speed of rotation varies to change the path of travel of the reflected light, a motor, means for bodily moving said reflector and light responsive means for controlling the speed of said motor in accordance with changes in the path of said reflected light.

19. In a speed regulating system, a source of light, a driven element adapted to direct the light selectively along a plurality of different paths and having a secondary movement adapted to transpose the light from one path to another as the speed of rotation varies, a motor, means for imparting the said secondary movement to the driven element and light responsive means for controlling the speed of said motor in accordance with the transposition of light from one path to another, said element being adapted to direct the light constantly and along paths which are substantially parallel.

20. In a speed regulating system, a source of light, a driven element adapted to reflect the light selectively along a plurality of different paths and having a secondary movement whereby to transpose the light from one path to another as the speed of rotation varies, a motor for driving said element, means for imparting said secondary movement to the driven element and light responsive means for controlling the speed of said motor in accordance with the transposition of the light from one path to another, said element being adapted to reflect the light constantly and along paths which are substantially parallel.

In testimony whereof I have hereunto set my hand.

ELWIN L. PETERSON.